(12) United States Patent
Shmuel

(10) Patent No.: US 6,697,017 B1
(45) Date of Patent: Feb. 24, 2004

(54) ALL DIGITAL APPARATUS FOR BEARING MEASUREMENT OF ELECTROMAGNETIC SOURCES

(75) Inventor: Amir Shmuel, Nofit (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 10/129,522

(22) PCT Filed: Nov. 6, 2000

(86) PCT No.: PCT/IL00/00724
§ 371 (c)(1), (2), (4) Date: May 7, 2002

(87) PCT Pub. No.: WO01/35120
PCT Pub. Date: May 17, 2001

(30) Foreign Application Priority Data

Nov. 8, 1999 (IL) .................................................. 132803

(51) Int. Cl.⁷ .............................. G01S 3/16; G01S 3/28
(52) U.S. Cl. ....................................................... 342/378
(58) Field of Search ................................ 342/378, 379, 342/380, 381, 382, 383, 384

(56) References Cited

U.S. PATENT DOCUMENTS

| | | |
|---|---|---|
| 3,934,204 A | 1/1976 | Hill |
| 4,203,114 A | 5/1980 | Gerst et al. |
| 4,209,791 A | 6/1980 | Gerst et al. |
| 4,423,420 A | 12/1983 | Krajewski |
| RE31,772 E | 12/1984 | Gerst et al. |
| 4,734,701 A * | 3/1988 | Grobert ....................... 342/380 |
| 4,855,748 A | 8/1989 | Brandao et al. |
| 5,661,485 A | 8/1997 | Manuel |
| 5,790,588 A | 8/1998 | Fukawa et al. |
| 5,796,366 A | 8/1998 | Grebnev et al. |

FOREIGN PATENT DOCUMENTS

GB 130490 8/1919

OTHER PUBLICATIONS

P. M. Eyring, "Compact DF antenna delivers high AOA accuracy", *Microwave & RF*, Jun. 1997.

Murthy et al., "Models simulate Butler–matirix–based DBDs", *Microwave & RF*, Jun. 1996.

B. Shellig, "A matrix–fed circular array for continuous scanning", *Proceedings of the IEEE*, Nov. 1968, pp. 2016–2027.

D. E. N. Davis et al., "An adaptive circular array for HF direction finding and null steering", *IEEE LCAP 1985* (Conf. Proc. 248).

J. R. F. Guy and D. E. N. Davies "Studies of the Adcock direction finder in terms of phase–mode excitations around circular arrays", *The Radio and Electronic Engineer*, vol. 53 No. 1, Jan. 1983.

R. Eiges and H. D. Griffiths, "Mode–space spatial spectral spectral estimation for circular arrays", *IEEE Proc.—Radar, Sonar Navig.*, vol. 141 No. 6, Dec. 1994.

T. Macnamara, "Simplified design procedures for Butler matrices incorporation 90° hybrids or 180° hybrids", *IEEE Proc.*, vol. 134 part H No. 1, Feb. 1987.

* cited by examiner

Primary Examiner—Theodore M. Blum
(74) Attorney, Agent, or Firm—Mark M. Friedman

(57) ABSTRACT

A device and method for determining the bearing of an incoming RF signal. The signal is received using a plurality of primary antenna element (5). Each antenna element feeds into a respective receiving channel (6) that downconverts the received RF signal to IF, preferably by mixing with a local oscillator signal. The local oscillator signal may be produced by diverting and combining portions of the received RF signals, by receiving the incoming RF signal using one or more auxiliary antennas (11), or by a tunable oscillator. Preferably, the local oscillator signal is conditioned and filtered before mixing. The IF signals are processed, either by analog or digital means, to infer the bearing of the incoming RF signal.

38 Claims, 5 Drawing Sheets

ALL DIGITAL APPARATUS FOR BEARING MEASUREMENT OF ELECTROMAGNETIC SOURCES

FIELD AND BACKGROUND OF THE INVENTION

The present invention relates to the field of bearing measurement of wideband electromagnetic emitters, used in communication radar and electronic warfare systems Systems involved in reception of electromagnetic signals, such as electronic warfare systems, radar systems and communication systems, often are required to locate the bearing of an electromagnetic source with high accuracy and high probability of intercept. Many systems are known in the art for performing this task, using different methods. One of the most advanced methods is known as "multimodal interferometry" or "circular interferometry". The basic idea started with the "Adcock bearing measurement", described in UK Patent No. 130490. This is basically a four element form of the circular interferometer. The principle of the Adcock bearing measurement has been expanded to any number of elements, with practical system implementations described, for example, in IL Patent No. 57910; and also by P. M. Eyring, "Compact DF antenna delivers high AOA accuracy", *Microwave & RF*, June 1997; and by Murthy et al., "Models simulate Butler-matirix-based DBDs", *Microwave & RF*, June 1996. Some expansions of the theory of phase modes have been published. See for example: B. Shellig, "A matrix-fed circular array for continuous scanning", *Proceedings of the IEEE*, November 1968, pp. 2016–2027; D. E. N. Davis et al., "An adaptive circular array for HF direction finding and null steering", *IEEE LCAP* 1985 (Conf. Proc. 248); J. R. F. Guy and D. E. N. Davies, "Studies of the Adcock direction finder in terms of phase-mode excitations around circular arrays", *The Radio and Electronic Engineer*, vol. 53 no. 1, January 1983; and R. Eiges and H. D. Griffiths, "Mode-space spatial spectral estimation for circular arrays", *IEEE Proc.—Radar, Sonar Navig.*, vol. 141 no. 6, December 1994. All of these expansions suffer from severe practical implementation difficulties.

The concept of using phase modes in a bearing measurement system now will be described briefly, referring to FIG. 1. An aggregate of receiving antenna elements 1 are equispaced around a circle. This aggregate feeds a RF Butler matrix 2 which is a modal-beam-forming netwvork that includes RF hybrid combiners and phase shifters, interconnected by RF transmission lines, as described, for example, in T. Macnamara, "Simplified design procedures for Butler matrices incorporating 90° hybrids or 180° hybrids", *IEEE Proc.*, vol. 134 part H no. 1, February 1987. The function of RF Butler matrix 2 is to phase-shift and sum the signals from all antenna elements 1 into several outputs, which are called modal beams. For modal beam numbered M in an array consisting of N elements 1, the weighted sum is:

$$S(M) = \frac{1}{\sqrt{N}} \sum_{i=0}^{N-1} s(i) \exp\left(\frac{2\pi i M}{N}\right)$$

where s(i) is the signal out of element i and S(M) is the signal out of modal beam M. This operation, which is equivalent to a Discrete Fourier Transform, is performed in the RF domain.

The modal beams have the following two major properties:

1. Each beam has a quasi-omnidirectional amplitude pattern, which means that the signal strength does not depend on the azimuth angle of the source.
2. The phase of modal beam M, θ(M), is quasi-proportional to the azimuth angle φ of the source, with M being the constant of proportioinality:

$$\theta(M) = M\phi$$

Thus, by measuring the modal phases, it is straightforward to extract an estimate of the azimuth angle of the source. The higher the mode, the higher the accuracy; but measurements of lower order modes is required in order to resolve ambiguities occurring in the higher order modes. The inherent circular symmetry of the phase modes concept lends itself to most compact, minimal channel count designs, with minimal frequency, polarization and elevation dependence.

The modal beams from RF Butler matrix 2 are input to a set of multichannel receivers 3. Phase measurements of the modal beams have been implemented using several types of multichannel receivers 3, all tackling the task of amplification, dynamic range handling and correlating (phase measurement). Finally, the outputs of multichannel receivers 3 are input to a digital processing unit 4 that carries out digital signal processing to extract the bearing of the received signal. The types of receivers 3 that have been used in practical systems include:

1. Direct broadband receivers, with broadband limiting amplifiers and broadband correlators.
2. Homodyne receivers of several implementations, for example the implementation taught by Manuel in U.S. Pat. No. 5,661,485. These receivers downconvert all the channels to a single tone Intermediate Frequency (IF) signal, using one of the modal beams as a reference local Oscillator (LO), after the proper frequency shift. The dynamic ranging and the correlation between modal beams is performed in IF.
3. Super heterodyne receivers, which downconvert a predetermined portion of the spectrum into IF signals and perform the correlation in IF.

All of the prior art implementations use RF Butler matrix 2 as the spatial processor that produces the modal beams in the RF domain, the shortcomings of this approach stem from the limitations imposed by RF Butler matrix 2:

1. RF Butler matrix 2 has a considerable insertion loss (5 to 8 dB at 18 Ghz). This reduces the system's sensitivity. Using a low noise preamplifier on each antenna element 1 alleviates this problem, at the expense of complexity, cost and also reduced accuracy, because of the transmission mismatch between amplifiers, which is hard to calibrate.
2. RF Butler matrix 2 has inherent inaccuracies which are hard to control, especially at the broadband and high frequencies often encountered in practical systems. These inaccuracies transform into deviations from the ideal phase-azimuth relationship, generating large bearing estimation errors. While sonic of these errors may be linearized, not all of these errors can be corrected; and the overall system performance is very sensitive to measurement errors, multipath, multisignals and reflections.
3. RF Butler matrix 2 is a very complicated RF supercomponent, imposing realization difficulties, high cost and mechanical constraints.
4. Advanced bearing algorithms for implementing null steering, multisource discrimination, etc., can not be used in practice because of the limited accuracy and the practically available phase modes from RF Butler matrix 2.

There is thus a widely recognized need for, and it would be highly advantageous to have, a device and method for broadband reception and bearing measurement of RF sources that does not employ a very difficult, highly specialized RF beamforming supercomponent such as RF Butler matrix 2.

SUMMARY OF THE INVENTION

The present invention is an innovative device and method for circular interferometry. The present invention eliminates the drawbacks and limitations of the RF processing unit used in the prior art by replacing the RF processing performed by this unit with digital or IF processing.

According to the present invention there is provided a device for determining a bearing of an incoming RF signal, including: (a) a plurality of primary antenna elements for receiving the RF signal; (b) for each primary antenna, a receiving channel for downconverting the received RF signal to a respective IF signal, each IF signal having a respective amplitude and a respective phase; and (c) a processing mechanism for inferring the bearing from the amplitudes and the phases.

Preferably, the primary antenna elements are equally spaced around at least a portion of a circle. Preferably, each primary antenna element is provided with an amplifier for amplifying the received RF signal.

Preferably, the receiving channels are homodyne receivers or heterodyne receivers.

Preferably, the device further includes a source of a local oscillator signal. The oscillator signal is introduced to each receiving channel via a port and is mixed with the received RF signal to produce the IF signal. In one embodiment of the device, the source includes a complex weighting combiner and, for each primary antenna element, a power splitter for diverting a portion of the received RF signal to the complex weighting combiner. One embodiment of the complex weighting combiner includes, for each primary antenna, a respective I/Q modulator, Another embodiment of the complex weighting combiner includes, for each primary antenna, a respective phase shifter and attenuator. In a second embodiment of the device, the source includes at least one auxiliary antenna for receiving the RF signal. In a third embodiment of the device, the source includes a tunable oscillator.

Preferably, the device further includes a distribution mechanism for distributing the local oscillator signal to the ports of the receiving channels. Preferably, the distribution mechanism also conditions the local oscillator signal, specifically, by amplifying the local oscillator signal, by amplitude-limiting the local oscillator signal, or by frequency shifting the local oscillator signal. Preferably, the distribution mechanism also filters the local oscillator signal.

According to one embodiment of the device, the processing mechanims is digital, and includes a digitizer for each receiving channel, and also a digital signal processor for computing the bearing from the digitized signals. According to another embodiment of the device, the processing mechanism is analog, and includes components such as hybrid networks, phase shifters, attenuators and I/Q modulators. Preferably, the analog processing mechanism includes an IF Butler matrix.

According to the present invention there is provided a method of determining a bearing of an incoming RF signal, including the steps of: (a) receiving the incoming RF signal, at a plurality of primary antenna elements, as a corresponding plurality of received RF signals; (b) downconverting the received RF signals to corresponding IF signals, each IF signal having a respective amplitude and phase; and (c) inferring the bearing from the amplitudes and the phases.

Preferably, the received RF signals are amplified prior to downconversion.

Preferably, the downconverting is effected by mixing each received RF signal with a local oscillator signal. There are three preferred methods of providing candidate signals to be used as the local oscillator signal. The first method is to divert a portion of the received RF signals and to combine the diverted RF signals. The second method is to use the incoming RF signal itself, as received by an auxiliary antenna. The third method is to use a tunable oscillator. The local oscillator signal actually used may be obtained by switching among two or among all three of these candidates, or alternatively by multiplexing two or all three of these candidates. Preferably, the local oscillator signal is conditioned and/or filtered prior to mixing. Examples of conditioning the local oscillator signal include amplifying the local oscillator signal, amplitude-limiting the local oscillator signal, and frequency shifting the local oscillator signal.

One preferred method of inferring the bearing is digital. The IF signals are digitized and the digitized signals are processed digitally. Preferably, the digital processing includes beam shaping. Preferably, the digital processing includes emulating a Butler matrix. Another preferred method of inferring the bearing is analog.

Preferably, the downconverting is effected using, for each received RF signal, a corresponding receiving channel. Preferably, the receiving channels are calibrated by injecting therein a calibration signal. Preferably, the calibration signal is injected at a common reference plane.

The present invention solves the problems imposed by RF Butler matrix 2 on the performance of a multi-modal circular interferometer by eliminating RF Butler matrix 2 altogether. The mathematical functions of RF Butler matrix 2 are performed either digitally or in IF.

A common signal derived either from an auxiliary external antenna of any type, or from the weighted sum of all the primary antenna elements, is used as a Shared Local Oscillator Signal (SLOS). This SLOS is used in a multichannel homodyne receiver of any type to downconvert the signals from all the primary antenna elements into single tone IF signals having the same phase and amplitude properties as the respective elements. These IF signals may be processed with an analog IF processor that performs the equivalent function of RF Butler matrix 2. Alternatively, and preferably, the IF signals are digitized into complex digital representations thereof, and the mathematical function of RF Butler matrix 2, and also any related algorithms, are performed in a Digital Signal Processing Unit. By substituting an external LO signal, derived from any type of oscillator, for the SLOS, a superheterodyne frequency-scanning receiver is implemented, using most of the components of the SLOS embodiment.

The improved performance of the present invention over the prior art includes:

1. Better system sensitivity, due to elimination of the losses associated with Rf Butler matrix 2.
2. Better bearing measurement accuracy and stability, due to elimination of errors introduced by RF Butler matrix 2.
3. Reduced system complexity and enhanced system modularity, due to elimination of RF Butler matrix 2.

4. Implementability of other spatial filtering algorithms, by improved accuracy and availability of all the signals.

The homodyne embodiment of the present invention is superficially similar to a circular interferometer based on the phase interferometer described in the above-referenced U.S. Pat. No. 5,661,485. The principal difference between the present invention and this prior art circular interferometer is that this prior art interferometer effects spatial processing of the received RF signals using an RF spatial processor such as RF Butler matrix 2, downconverts the spatially processed RF signals to IF, and infers the bearing of the incoming RF signal from only the phases of the IF signals, without regard to the amplitudes of the IF signals; whereas the present invention downconverts the received RF signals to IF with no intermediate RF spatial processing and then infers the bearing of the incoming RF signal from both the amplitudes and the phases of the IF signals.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a circular interferometer and a method for its use. Specifically, the present invention can be used to determine the bearing of an incoming RF signal without the inaccuracies associated with RF spatial processing.

The principles and operation of bearing measurement according to the present invention may be better understood with reference to the drawings and the accompanying description.

Figure 1:
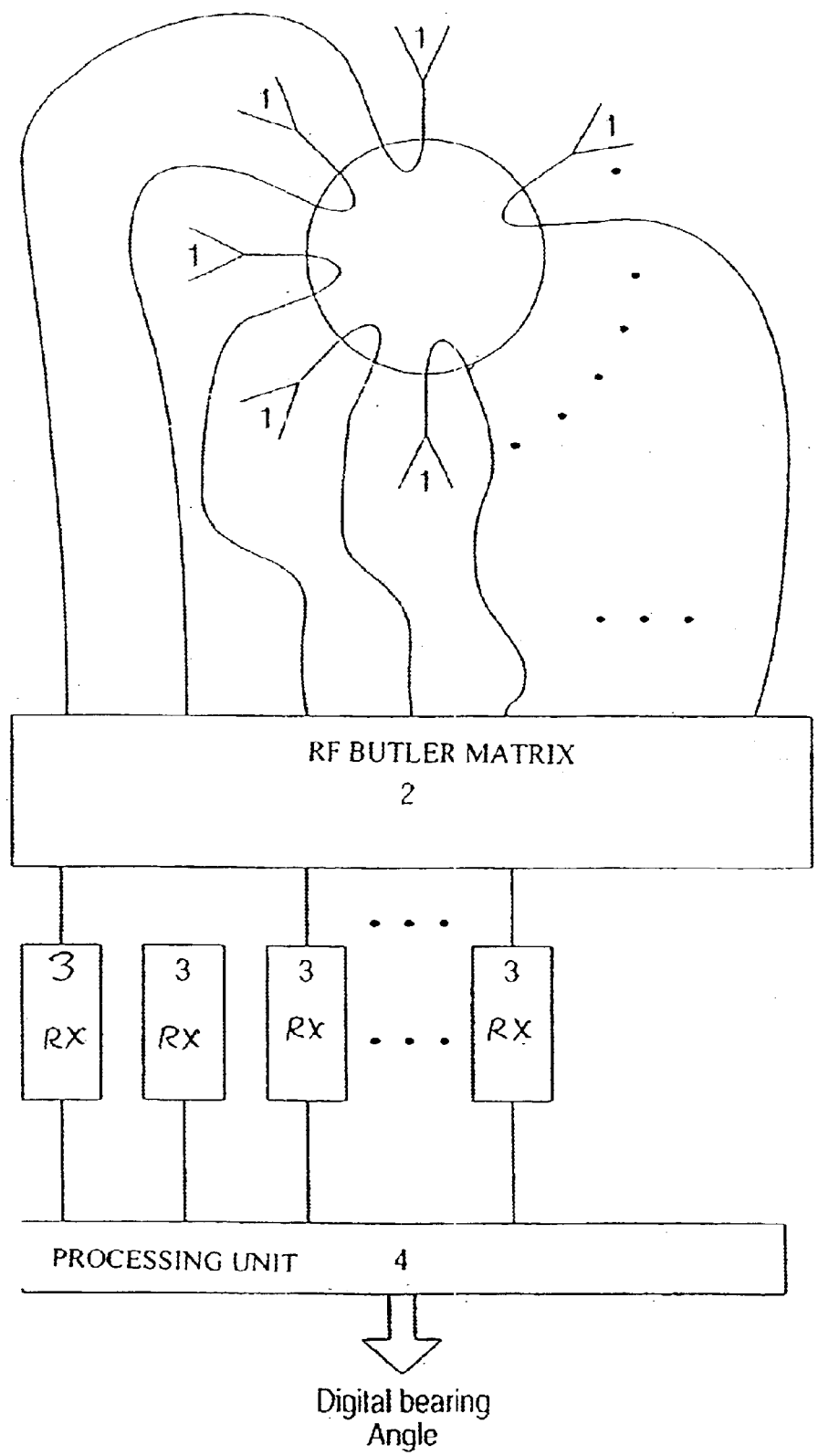
FIG. 1 illustrates a prior art interferometry system.
Figure 2:
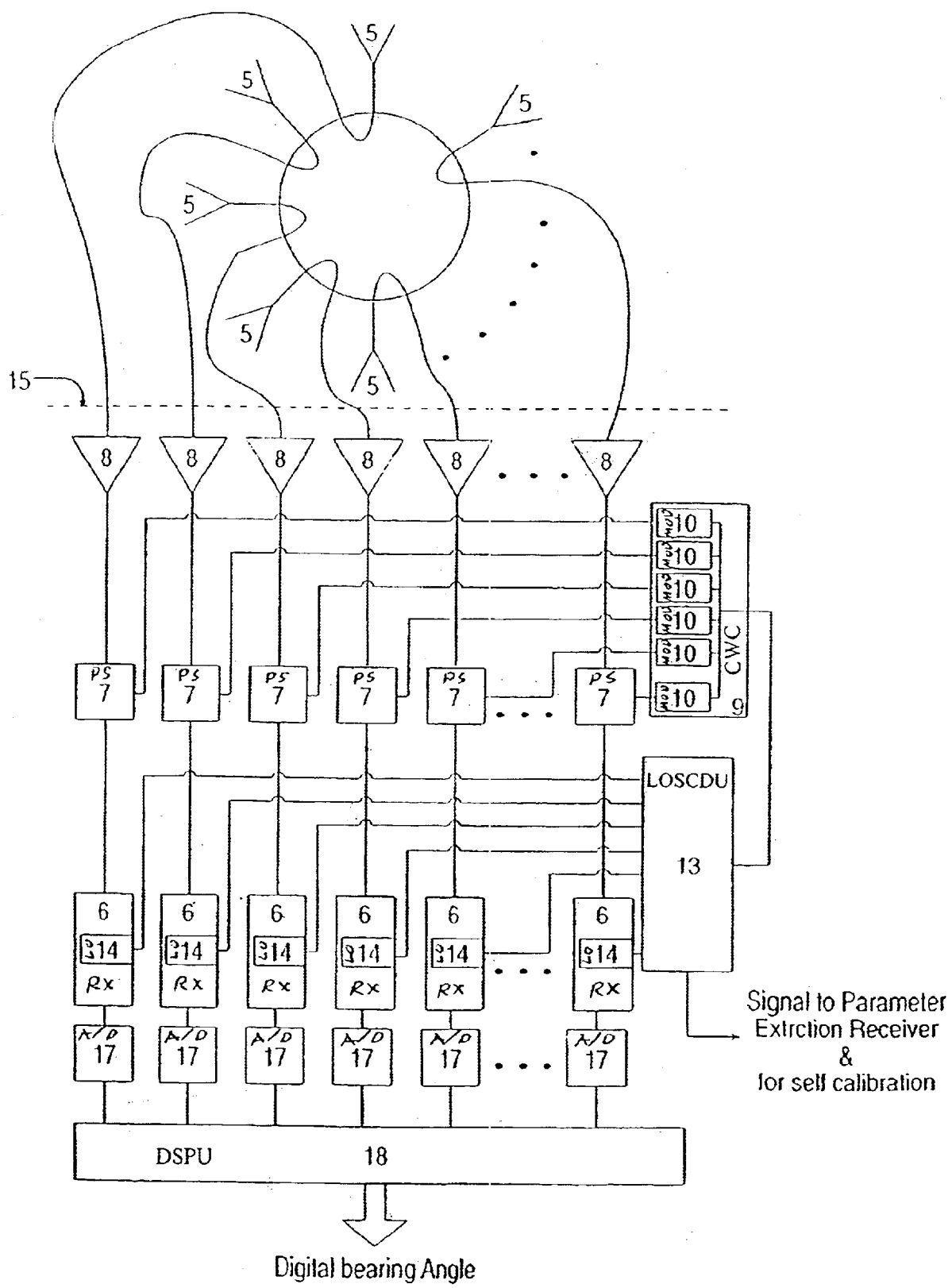
FIG. 2 illustrates a first embodiment of the present invention that uses a sample from each primary antenna element to produce the local oscillator signal.

Returning now to the drawings, FIG. 2 illustrates an embodiment of the device of the present invention that includes an arbitrary number of primary antenna elements 5, preferably but not necessarily equally spaced around a circle or around a portion of a circle. Primary antenna elements 5 may be of any type, including but not limited to monopoles, dipoles, slots in ground, notches, patches, arrayed elements and combined elements. Primary antenna elements 5 collectively constitute a primary antenna that optionally may be surrounded by a polarization twister and optionally may be covered by a radome.

Each primary antenna element 5 feeds a respective receiving channel 6. Receiving channel 6 may be of any type. Preferably, receiving channel 6 is a homodyne receiver of any implementation. The homodyne function is to downconvert any Radio Frequency (RF) signal present at the input thereof to a single tone IF signal that preserves the phase and amplitude properties of the input RF signal. A homodyne receiver achieves this goal for a very broad band input spectrum by using a sample of the input RF signal itself as a Local Oscillator (LO) input for a frequency conversion mixer, as is known in the art. In order to attain an IF frequency that is not zero, some sort of frequency shifting usually but not necessarily is performed on the signal and the LO replica thereof, producing a final mixing product that is the desired IF signal with minimal spurious content.

The Shared LO Signal (SLOS) may be derived in several ways:

1. FIG. 2 illustrates the principal embodiment of the present invention, in which a sample of the signal from each primary antenna element 5 is taken using any type of power splitter 7, including but not restricted to Wilkinson power dividers, hybrid couplers or active couplers. The sampling preferably but not necessarily is performed following amplification by low noise amplifiers 8 to improve the system's sensitivity. The samples from primary antenna elements 5 are combined by a complex weighting combiner 9 that includes an I/O modulator 10 (or an equivalent phase shifter and attenuator) on each input. Modulators 10 may be fixed or programmed to produce any combined antenna array spatial pattern. The spatial patterns that can be produced range from an omnidirectional pattern, through a directional beam steered to a desired direction, to a spatial null (or several nulls) pointed to undesired reception directions. The special case of switching off several primary antenna elements 5 produces a moderately directional beam; and the simplest special case of an equi-phase power combiner produces an omnidirectional beam.

Figure 3:
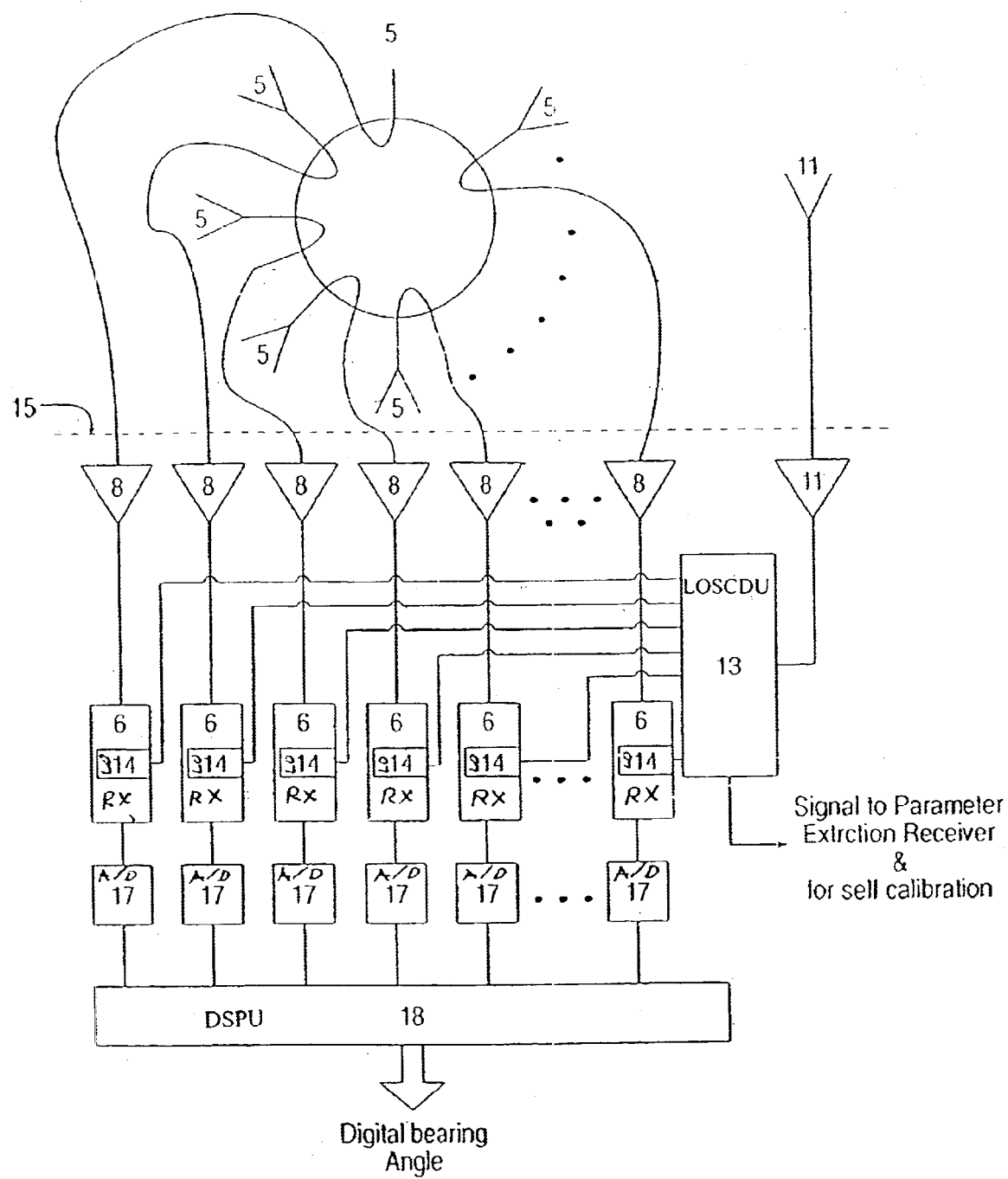
FIG. 3 illustrates a second embodiment of the present invention that uses an auxiliary antenna to produce the local oscillator signal.

2. FIG. 3 illustrates another embodiment of the present invention that uses a different method to provide the SLOS. In this embodiment, the SLOS is derived from a separate auxiliary antenna 11, of any type, that may or may not share the same aperture with primary antenna elements 5. Auxiliary antenna 11 may have a static pattern (directional/omnidirectional) or a dynamic pattern (phased array, multi-beam array, switched antennas, rotating antenna, etc.). The SLOS may be switched or multiplexed between the internal reference of FIG. 2 and auxiliary antenna 11, or among several auxiliary antennas 11.

Figure 4:
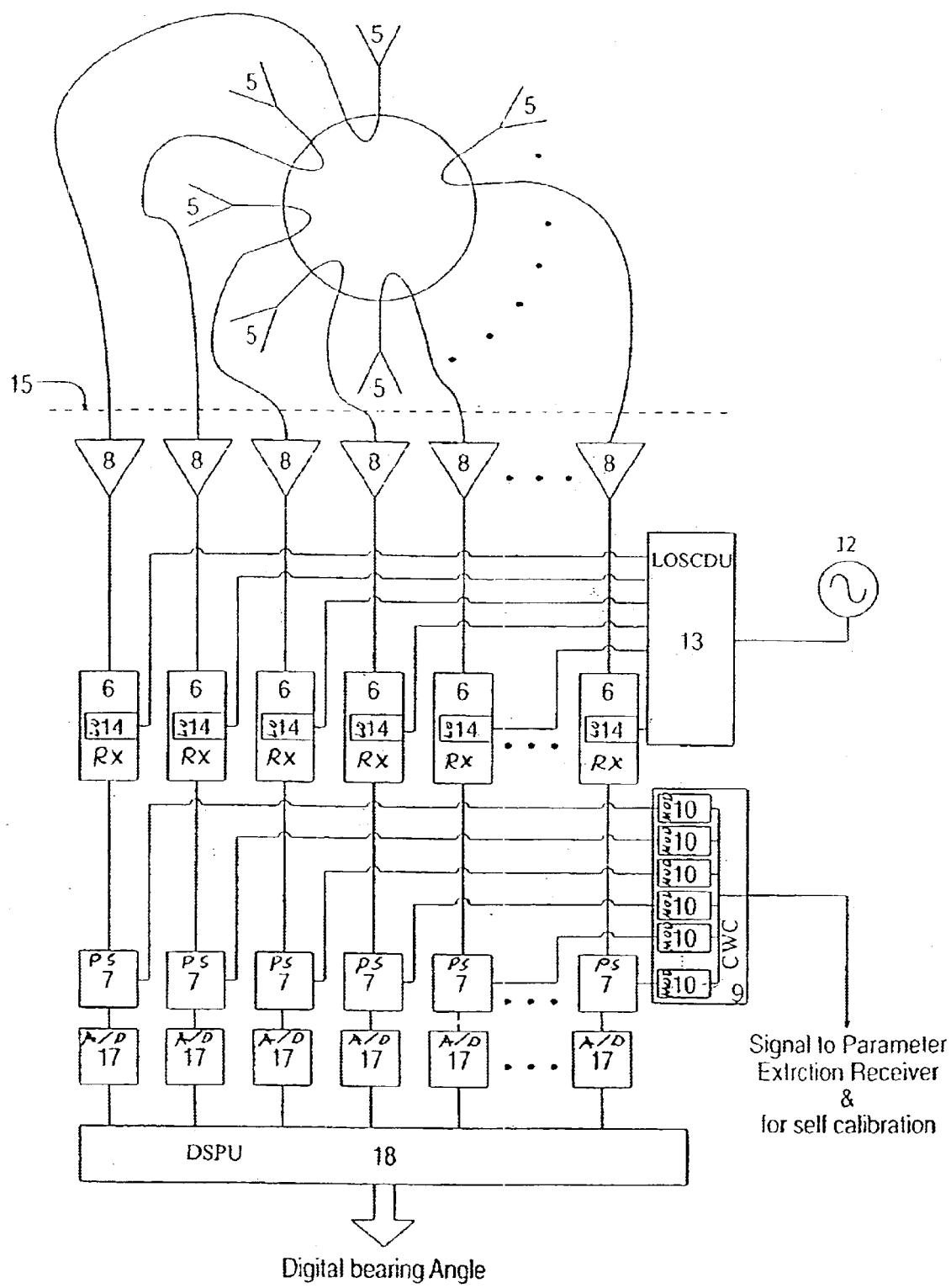
FIG. 4 illustrates a third embodiment of the present invention that uses an externally produced local oscillator signal to add a superheterodyne feature to the device of the present invention.
Figure 5:
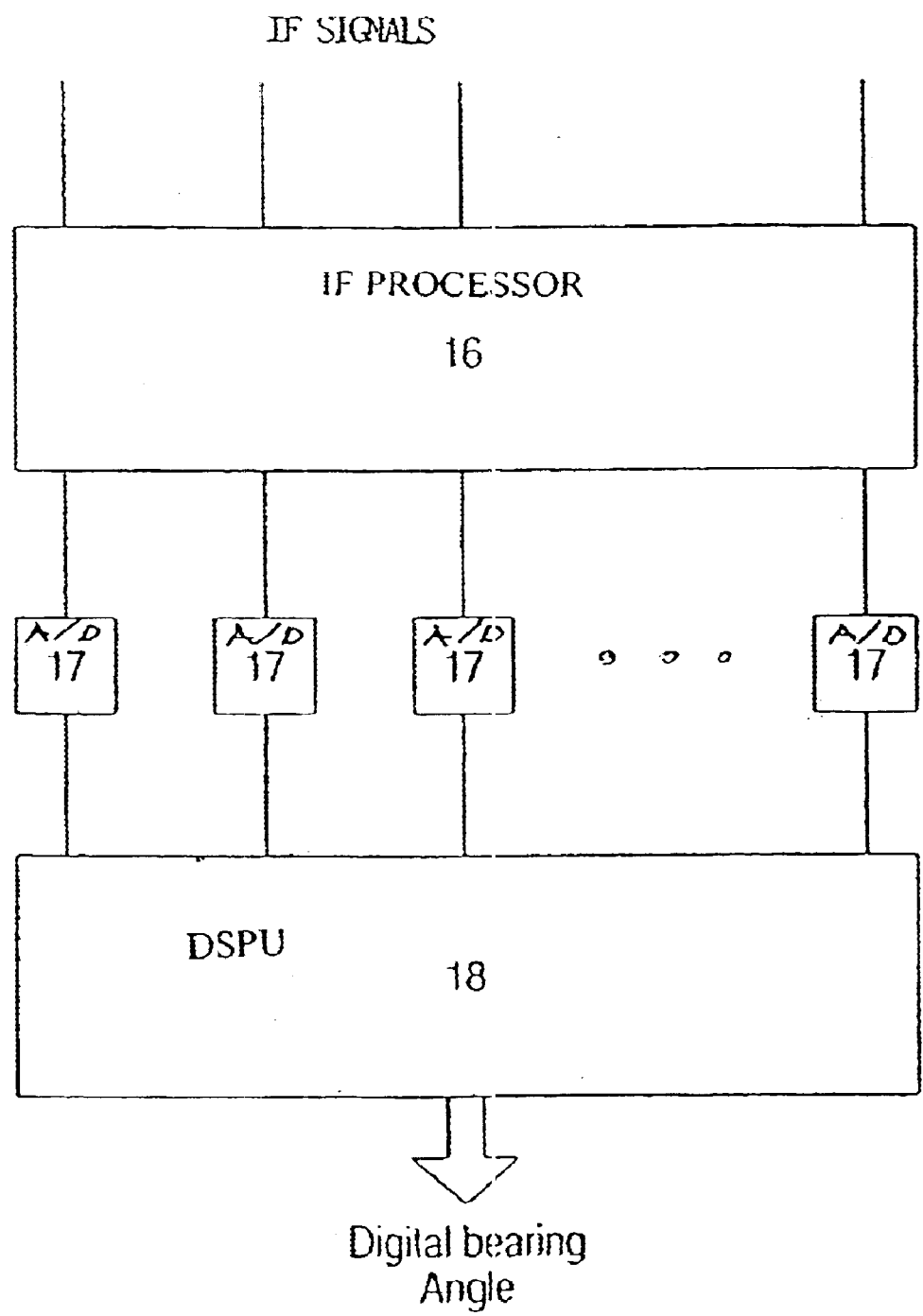
FIG. 5 illustrates a fourth embodiment of the present invention that uses an IF modal beam forming matrix as an IF signal processor.

3. FIG. 4 illustrates another embodiment of the present invention, in which the LO signal is derived from an independent oscillator 12 which is tuned to downconvert any relatively narrow-band portion of the RF spectrum into the system's IF. Thus, the embodiment of FIG. 4 is a superheterodyne embodiment of the present invention that shares most of its components with the embodiments of FIGS. 2 and 3. The superheterodyne LO may be switched in place of the wideband signal generated SLOS, or as a parallel subsystem that shares the same aperture and the same amplifiers 8 of the wideband subsystem. Note that the common signal for signal processing and self calibration is extracted by the same methods mentioned before, but in the IF domain.

4. Any combination of the embodiments of FIGS. 2, 3 and 4 to generate the LO signal or the SLOS.

Optionally, the SLOS is amplified, limited in amplitude, and/or frequency shifted by a Shared LO Signal Conditioning and Distribution Unit (LOSCDU) 13. LOSCDU 13 distributes the SLOS to LO port 14 of each receiving channel 6. Receiving channels 6 and LOSCDU 13 provide for signal purity from noise, non-linearity induced spurious signals, inter-channel interference, VSWR, etc., as is known to those skilled in the art. The device of the present invention also provides for injection of a calibration signal into receiver channels 6, preferably as close as possible to primary antenna elements 5, with reference plane 15 being a preferred location for injection of a calibration signal. Injection may be implemented using any kind of switch or coupling device. The purposes of the calibration include compensation for any error imposed by channel-to-channel mismatch. Calibration schemes that are known in the art include those that use a replica of the received signal itself and those that use an external source. The scope of the present invention includes all suitable calibration schemes.

As the common channel of the present invention, LOSCDU 13 plays a major role in the present invention. LOSCDU 13 may implement filtering in any manner in the frequency domain. LOSCDU 13 may effect manipulations in the time domain. It is clear from the various possible sources of the local oscillator signal that spatial filtering also may be achieved through LOSCDU 13. LOSCDU 13 also supplies the signal for frequency measurements and for signal characteristics other than direction. All such operations on the SLOS are within the scope of the present invention.

The IF outputs from receiving channels 6 may be processed in several ways, of which the major possibilities included within the scope of the present invention are:

1. An IF processor 16 that uses hybrid networks, phase shifters, attenuators (or I/Q modulators) to produce spatial phase/amplitude patterns. One possibility is to build a Butler matrix in the narrow band low frequency IF domain, with improved performance over RF Butler matrix 2.

2. Digitize the IF output of each receiving channel 6 using a digitizer 17 to produce a complex digital representation of this IF output. Do all the processing of the digitized outputs in a Digital Signal Processing Unit (DSPU) 18. In particular, this digital processing may include emulation of RF Butler matrix 2 or derivatives thereof, or any other related bearing estimation algorithm, producing digital representations of the phase modes or their equivalents and a bearing estimate of the received signal. This digital processing also may include any beam shaping scheme, including, among others, adaptive or nonadaptive nulling algorithms. This option has the advantages of flexibility, accuracy, repeatability, modularity and small volume and weight.

While the invention has been described with respect to a limited number of embodiments, it will be appreciated that many variations, modifications and other applications of the invention may be made.

What is claimed is:

1. A device for determining a bearing of an incoming RF signal, comprising:
   (a) a plurality of primary antenna elements for receiving the RF signal;
   (b) for each said primary antenna, a receiving channel for downconverting the received RF signal to a respective IF signal, each said IF signal having a respective amplitude and a respective phase; and
   (c) a processing mechanism for explicitly inferring the bearing from said amplitudes and said phases.

2. The device of claim 1, wherein said primary antenna elements are equally spaced around at least a portion of a circle.

3. The device of claim 1, further comprising:
   (d) for each said primary antenna, an amplifier for amplifying said received RF signal.

4. The device of claim 1, wherein said receiving channels are homodyne receivers.

5. The device of claim 1, wherein said receiving channels are heterodyne receivers.

6. The device of claim 1, further comprising:
   (d) a source of a local oscillator signal;
   and wherein each said receiving channel includes a port for receiving said local oscillator signal, said each receiving channel mixing said local oscillator signal with said RF signal to produce said respective IF signal.

7. The device of claim 6, wherein said source includes:
   (i) a complex weighting combiner; and
   (ii) for each said primary antenna, a power splitter for diverting a portion of said received RF signal to said complex weighting combiner.

8. The device of claim 7, wherein said complex weighting combiner includes, for each said primary antenna, a respective I/Q modulator.

9. The device of claim 7, wherein said complex weighting combiner includes, for each said primary antenna, a respective phase shifter and attenuator.

10. The device of claim 6, wherein said source includes at least one auxiliary antenna for receiving the RF signal.

11. The device of claim 6, wherein said source includes a tunable oscillator.

12. The device of claim 6, further comprising:
   (e) a distribution mechanism for distributing said local oscillator signal to said ports.

13. The device of claim 12, wherein said distribution mechanism is operative to condition said local oscillator signal.

14. The device of claim 13, wherein said conditioning is selected from the group consisting of amplifying, amplitude limiting and frequency shifting.

15. The device of claim 12, wherein said distribution mechanism is operative to filter said local oscillator signal.

16. The device of claim 1, wherein said processing mechanism includes:
   (i) for each said receiving channel, a digitizer for digitizing said respective IF signal; and
   (ii) a digital signal processor for computing the bearing from said digitized signals.

17. The device of claim 1, wherein said processing mechanism is an analog processing mechanism.

18. The device of claim 17, wherein said analog processing mechanism includes components selected from the group consisting of hybrid networks, phase shifters, attenuators and I/Q modulators.

19. The device of claim 17, wherein said processing mechanism includes an IF Butler matrix.

20. A method of determining a bearing of an incoming RF signal, comprising the steps of:
   (a) receiving the incoming RF signal, at a plurality of primary antenna elements, as a corresponding plurality of received RF signals;
   (b) downconverting the received RF signals to corresponding IF signals, each said IF signal having a respective amplitude and phase; and
   (c) explicitly inferring the bearing from said amplitudes and said phases.

21. The method of claim 20, further comprising the step of:
   (d) amplifying said received RF signals.

22. The method of claim 20, further comprising the step of:
 (d) providing a local oscillator signal, said downconverting being effected by steps including mixing each said received RF signal with said local oscillator signal.

23. The method of claim 22, wherein said providing of said local oscillator signal is effected by steps including:
 (i) diverting a portion of each said received RF signal; and
 (ii) combining said diverted RF signals.

24. The method of claim 23, wherein said combining is effected using a complex weighting combiner.

25. The method of claim 22, wherein said providing of said local oscillator signal is effected by steps including receiving the incoming RF signal using at least one auxiliary antenna.

26. The method of claim 22, wherein said providing of said local oscillator signal is effected using a tunable oscillator.

27. The method of claim 22, wherein said providing of said local oscillator signal is effected by switching among at least two candidate signals selected from the group consisting of:
 (i) a first candidate signal obtained by steps including diverting and combining portions of said received RF signals;
 (ii) a second candidate signal obtained by steps including receiving the incoming RF signal using at least one auxiliary antenna; and
 (iii) a third candidate signal produced by a tunable oscillator.

28. The method of claim 22, wherein said providing of said local oscillator signal is effected by multiplexing at least two candidate signals selected from the group consisting of:
 (i) a first candidate signal obtained by steps including diverting and combining portions of said received RF signals;
 (ii) a second candidate signal obtained by steps including receiving the incoming RF signal using at least one auxiliary antenna; and
 (iii) a third candidate signal produced by a tunable oscillator.

29. The method of claim 22, further comprising the step of:
 (e) conditioning said local oscillator signal, prior to said mixing.

30. The method of claim 29, wherein said conditioning includes at least one step selected from the group consisting of amplifying, amplitude limiting and frequency shifting.

31. The method of claim 22, further comprising the step of:
 (e) filtering said local oscillator signal, prior to said mixing.

32. The method of claim 20, wherein said inferring is effected by steps including:
 (i) digitizing said IF signals; and
 (ii) digitally processing said digitized IF signals.

33. The method of claim 32, wherein said digital processing includes beam shaping.

34. The method of claim 32, wherein said digital processing includes emulating a Butler matrix.

35. The method of claim 20, wherein said inferring is effected using an analog processing mechanism.

36. The method of claim 20, wherein said downconverting is effected using, for each said received RF signal, a corresponding receiving channel, the method further comprising the step of:
 (d) calibrating each said receiving channel.

37. The method of claim 36, wherein said calibrating includes injecting a calibration signal into each said receiving channel.

38. The method of claim 37, wherein said injecting is effected, for all said receiving channels, at a common reference plane.

* * * * *